United States Patent Office 2,780,796
Patented Feb. 5, 1957

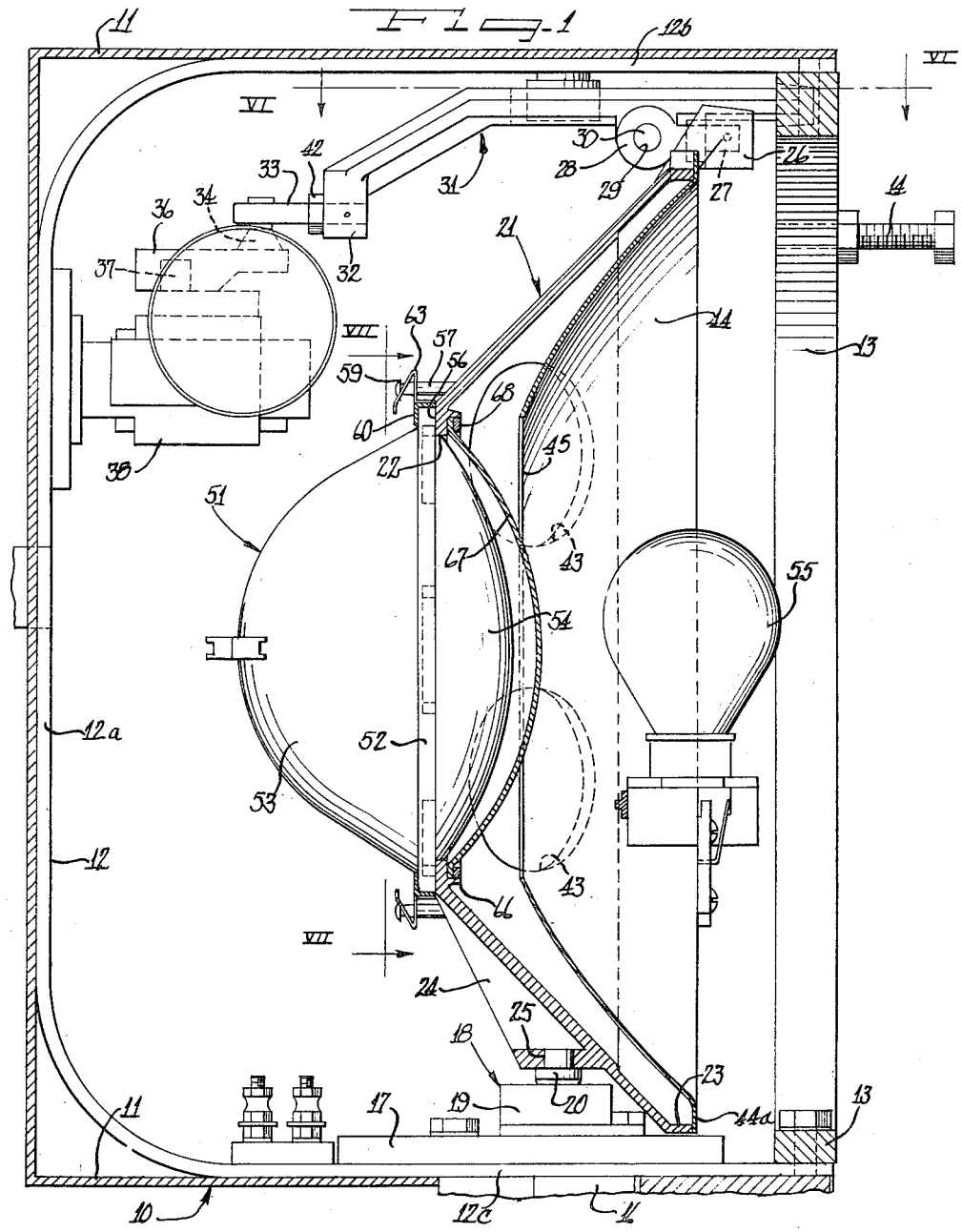

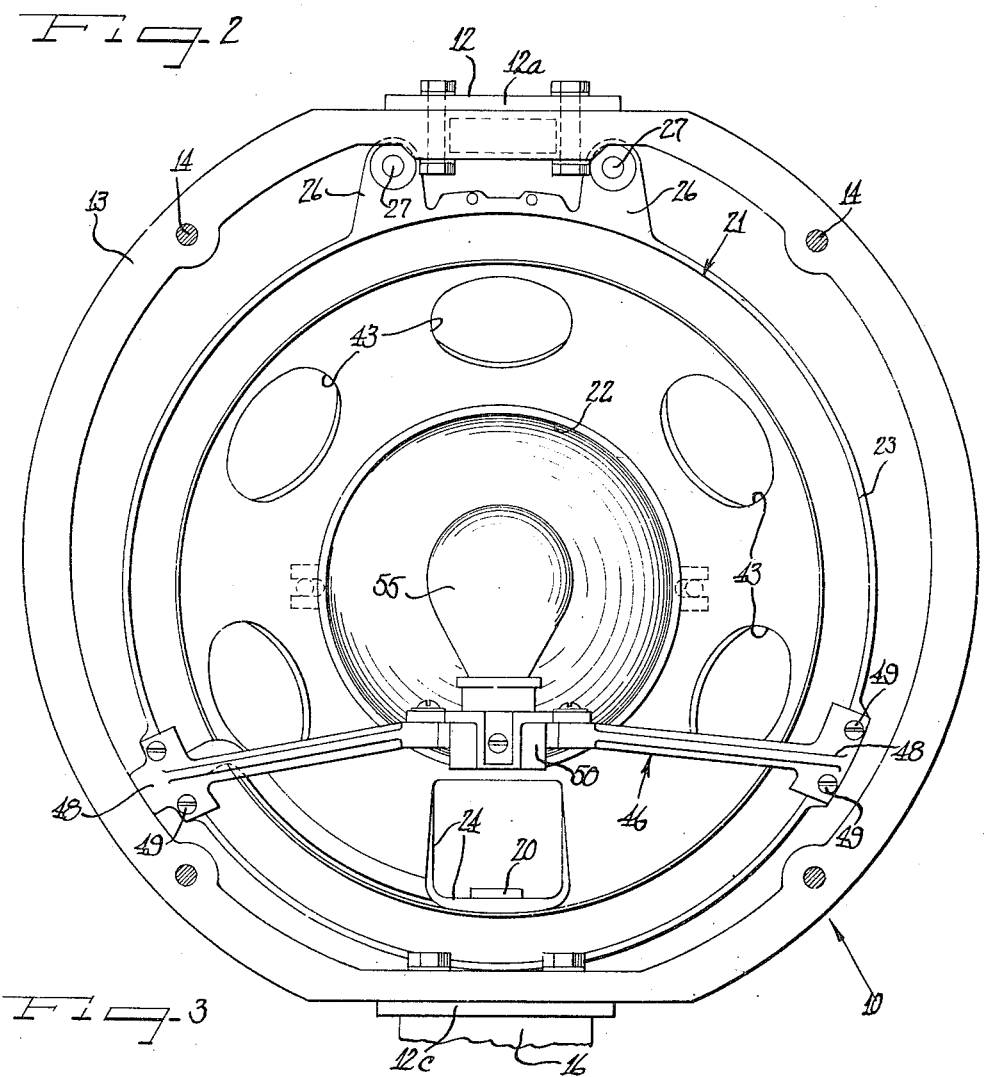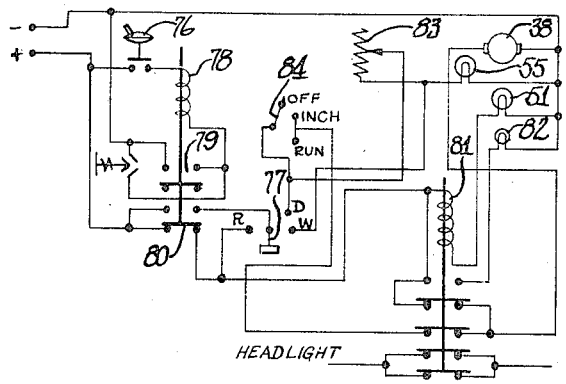

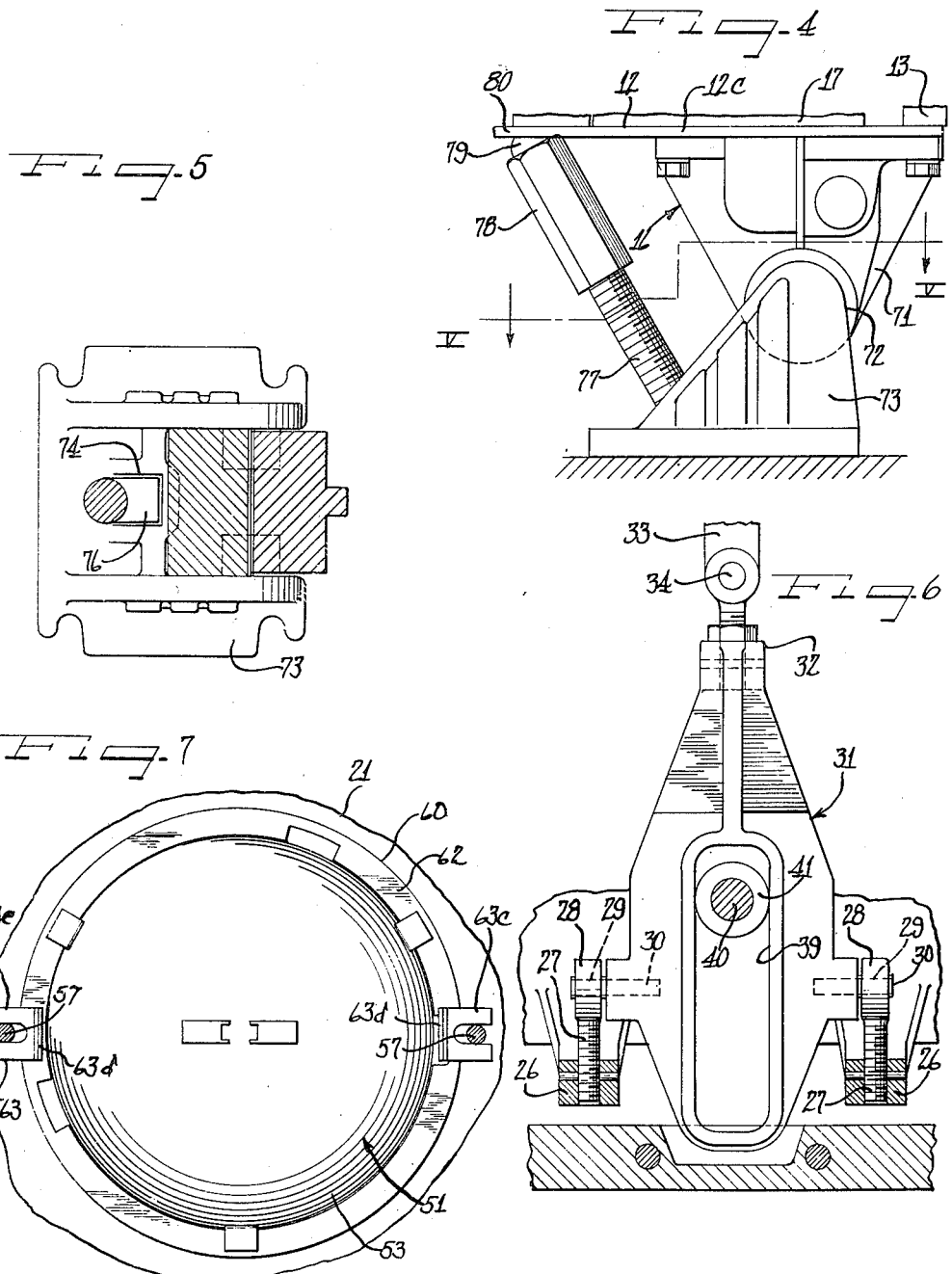

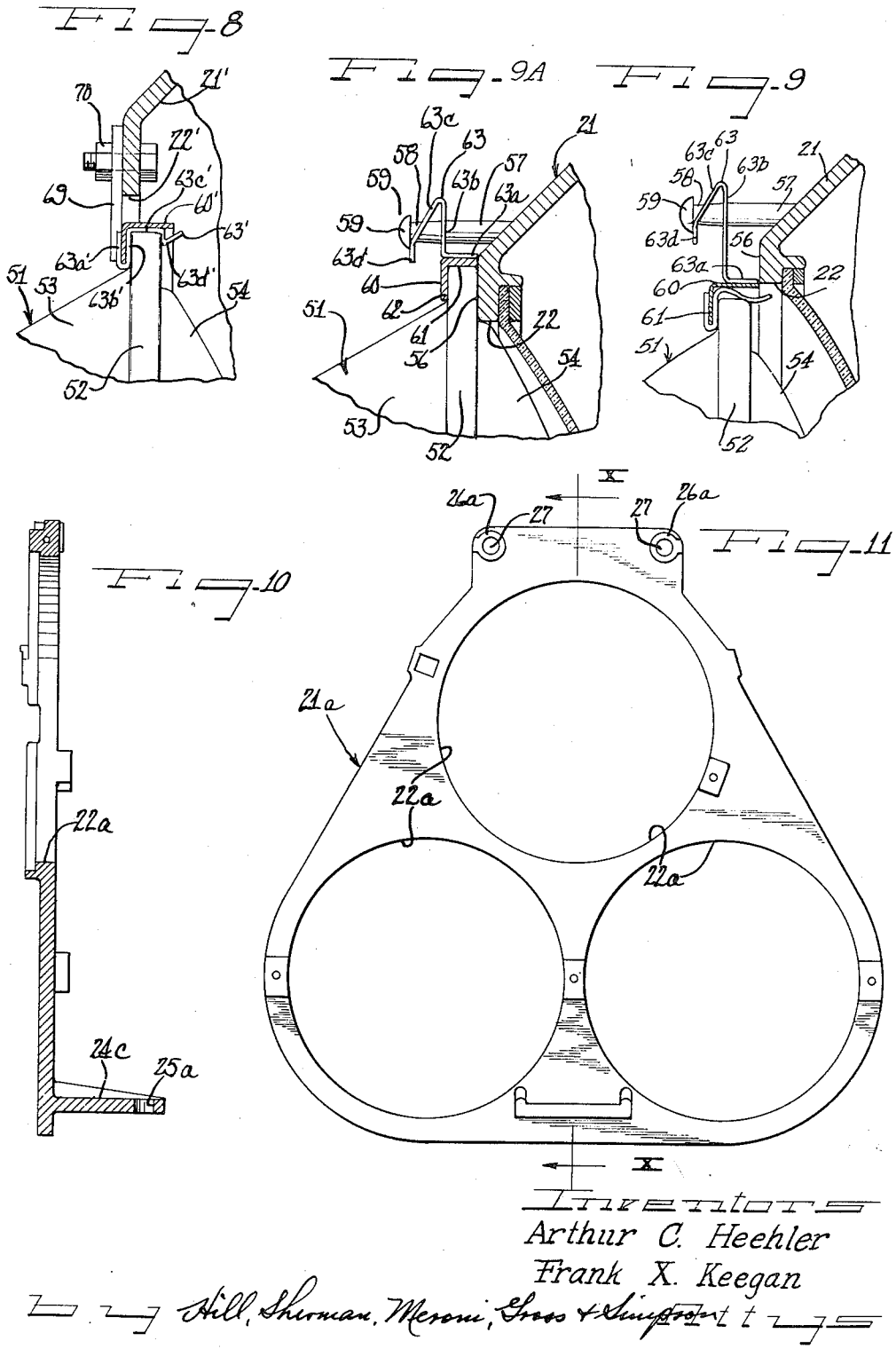

2,780,796

WARNING LIGHT WITH A RETAINER AND MOUNTING STRUCTURE FOR A SEALED BEAM LAMP

Arthur C. Heehler and Frank X. Keegan, Chicago, Ill., assignors to The Pyle-National Company, Chicago, Ill., a corporation of New Jersey Application July 20, 1953, Serial No. 369,044

13 Claims. (Cl. 340—49)

This invention relates generally to warning light structures for projecting moving beams of light on a projection path forming a moving pattern.

More specifically, the present invention relates to the provisions of a warning light comprising a reflector member having a curved reflective surface to collect and focus rays of light into the form of a beam of light and having a centrally disposed aperture formed therein. An electric light bulb is provided at the focal point of the reflective surface so that the rays of light emanating therefrom will be collected and focussed by the reflective surface and will be projected in a forward direction in the form of a beam of light.

In the centrally disposed opening is provided a sealed beam lamp of the type comprising a glass envelope having its own filament and reflective surface. The sealed beam lamp will project a second beam of light in a common direction with the first mentioned beam of light and substantially coaxial therewith. Circuit means are also provided to selectively energize either the sealed beam lamp or the electric light bulb.

The present invention further contemplates the provision of movable support means carrying the sealed beam lamp and the reflector member so as to adjust the direction of beam projection.

An electric drive motor may be provided with a driving connection to the support means so as to continuously oscillate the support means, thereby projecting either or both beams of light along a moving path in order to develop a motion pattern.

Since the sealed beam lamp and the electric light bulb, together with its associated reflector comprise two separate light sources, it is contemplated in accordance with the principles of the present invention to provide a color screen for interrupting the light rays emanating from one of the light sources, whereby a colored beam of light will be projected whenever the specific light source is energized. For example, a color screen is provided over the sealed beam lamp so that a colored beam of light will be projected whenever the sealed beam lamp is energized.

Because of the combination of a sealed beam type lamp with other forms of illumination means, it is contemplated in accordance with the principles of the present invention to provide a retaining mechanism for the sealed beam lamp which will position the sealed beam lamp in proper focal alignment and in firm assembly with the support means without requiring the use of soft gaskets or without requiring an expensive and complicated retaining mechanism necessitating the use of tools or requiring the attention of experienced personnel for servicing and replacement purposes.

In this regard, there is provided a pair of diametrically opposed posts projecting generally axially of each sealed beam lamp and adjacent an annular abutment surface against which the peripheral flange of the sealed beam lamp glass envelope may abut. An annular ring engages the opposite side of the flange on the sealed beam lamp and carries a spring clip which projects radially outwardly to engage each respective post. The spring clips preferably comprise the strip form members which are bent to form angularly intersecting legs prescribing an acute included angle therebetween. Both of the legs are slotted to provide a recess of sufficient width to receive the corresponding post and one of the legs is resiliently displaceable to snap in behind an enlarged head portion formed on each post so that the glass envelope sealed beam lamp will be firmly clamped resiliently between the abutment shoulder and the retainer ring.

In another form of retainer, the annular ring is provided with circumferentially spaced retainers effecting snap-in locking of a lamp. The annular ring may be directly connected to the support means.

It is an object of the present invention, therefore, to provide a warning light structure which effectively utilizes separate sources of illumination including a sealed beam type lamp and an incandescent bulb.

Another object of the present invention is to provide a warning light wherein multiple light source means project co-directional beams of light along a substantially common axis.

Another object of the present invention is to provide an improved mounting and retaining mechanism for a sealed beam lamp of the type comprising a glass envelope having its own filament and reflective surface.

Yet another object of the present invention is to provide an improved oscillating mechanism for a warning light capable of projecting a beam of light in a motion pattern.

Many other features, advantages and additional objects of the present invention will become manifest to those versed in the art upon making reference to the detailed description which follows and the accompanying sheets of drawings in which a preferred structural embodiment incorporating the principles of the present invention is shown by way of illustrative example only.

On the drawings:

Figure 1 is a cross-sectional view with parts shown in elevation and with parts removed for the sake of clarity showing a warning light incorporating the principles of the present invention;

Figure 2 is a front elevational view with parts removed of the warning light shown in Figure 1;

Figure 3 is a schematic circuit diagram illustrating one control system which may be utilized in connection with the warning light of the present invention;

Figure 4 is a side fragmentary elevational view of the position adjustment locking means provided for the warning light of the present invention;

Figure 5 is a cross-sectional view taken substantially on line V—V of Figure 4;

Figure 6 is a fragmentary cross-sectional view with parts shown in elevation taken substantially on line VI—VI of Figure 1;

Figure 7 is a fragmentary cross-sectional view with parts removed taken substantially on line VII—VII of Figure 1;

Figure 8 is a fragmentary elevational view showing an alternative embodiment of a retaining mechanism provided in accordance with the principles of the present invention;

Figure 9 is a fragmentary cross-sectional view with parts shown in elevation illustrating additional details of construction of the retaining mechanism shown in Figure 1;

Figure 9a is an alternative embodiment of the structure of Figure 9;

Figure 10 is a cross-sectional view taken substantially on line X—X of Figure 11; and Figure 11 is a front elevational view of a modified support plate provided in accordance with the principles of the present invention.

As shown on the drawings:

The warning light of the present invention is indicated generally by the reference numeral 10 and comprises a casing 11 open at one end and receiving in firm assembly therewith a frame bracket 12 comprising a strip form member bent to provide a U-shaped frame having a center body portion 12a, an upper leg portion 12b and a lower leg portion 12c, the leg portions 12b and 12c extending in general parallel spaced relationship to one another toward the open end of the casing 11.

An annular front ring 13 is carried by the frame bracket 12 and includes an adjustable positioning stud 14 which together with a pedestal support 16 may be utilized to adjust the position of the warning light 10 in the place of its use, for example, at the front end of a locomotive or some other vehicle in which it is desirable to utilize a warning light for warning and signalling purposes.

On the bottom support leg 12c is provided a mounting plate 17 carrying a pivot means taking the form of a universally rockable bearing 18. The bearing 18 comprises an outer housing 19 enclosing suitable bearing races and supporting and centering for universal tilting movement a bearing stud indicated at 20.

Extending between the upper leg 12b and the bottom leg 12c is a lamp support plate 21. In the embodiment of Figure 1, the lamp support plate 21 comprises a dish-shaped annular member having a centrally disposed opening 22 and including an outer peripheral rim section 23. There is further provided a rearwardly protruding support boss 24 apertured as at 25 to receive the bearing stud 20 whereby the lamp support plate 21 will be supported for universal pivoting movement.

Making particular reference to Figures 1, 2 and 6, it will be noted that toward the top of the lamp support plate 21, there is provided a pair of spaced boss portions 26 each suitably threaded to receive in assembly therewith the correspondingly threaded portions of a pair of studs 27, each provided on one end with an eye portion 28 suitably apertured as at 29 to receive a pin 30 extending therebetween.

The ends of each of the pins 30 are made secure in opposite sides of a link arm or lever arm 31 extending rearwardly in spaced relationship to the upper leg 12b.

The link arm 31 terminates in a boss portion 32 receiving the end of a rod end bearing 33 pivotally connected to a crank arm 34 carried by an eccentric member 36 rotated by the power takeoff shaft 37 of an electric motor 38 mounted on the body portion 12a of the frame bracket member 12.

As is clearly shown in Figure 6, the link member 31 is provided with an elongated slot 39 which extends in generally parallel relation to the leg 12b of the frame bracket 12. Attached to the leg 12b is a pin 40 carrying a bearing member 41 received in the slot 39 and engaging the walls thereof so as to effectively restrain the ambit of motion of the link arm 31 and, hence, the oscillatory movement of the lamp support plate 21.

The rod end bearing member 33 can be selectively adjusted and locked in adjustment by the lock nut 42 (Fig. 1), thereby adjusting the effective length of the linkage connection between the drive motor 38 and the support plate 21 so that the oscillatory movement of the plate 21 will correspond to a generally conical motion pattern or difference sizes of elliptical or modified elliptical motion patterns.

As may be seen in Figures 1 and 2, the support plate 21 is provided with a plurality of circumferentially spaced lightening holes 43. Inwardly of the support plate 21 is provided a curved reflector member 44 which is of general annular configuration so as to provide a centrally disposed aperture or opening 45 in register with the opening 22.

The reflector member 44 may conveniently take the form of a fragment section of a parabolic reflector having an opening formed at the centrally disposed portion thereof to provide the aperture 45. With such provision, the parabolic surface will form a curved reflector surface to collect and focus the rays of light into the form of a beam of light for projection outwardly of the lamp housing.

As shown on Figure 1, the reflector member 44 is provided with a peripheral rim 44a through which suitable fastening means may be passed to place the reflector member 44 in firm assembly with the rim portion 23 of the support plate 21.

As is more clearly shown in Figure 2, there is also provided in assembly with the support plate 21 a bracket member 46 which extends across a lower portion of the support plate 21 and includes boss portions 48 on opposite ends thereof through which may be passed fasteners indicated at 49 for placing the bracket member 46 in firm assembly with the support plate 21.

At the center of the bracket member 46 is provided a socket housing 50 receiving an incandescent lamp bulb 55. It will be understood that the bracket member 46 and the positioning thereof on the support plate 21 is so aligned as to locate the source of illumination provided by the incandescent bulb approximately at the focal point of the reflector member 44.

Positioned in the opening 22 of the support plate 21 is a sealed beam lamp 51 of the type comprising a glass envelope having its own filament and its own reflective surface. As shown in Figure 1, the sealed beam lamp 51 includes an annular glass support flange 52 located medially between a rearwardly projecting curved portion 53 and a forwardly projecting curved portion 54. The forwardly projecting portion 54 is preferably of clear glass and forms a lens for the sealed beam lamp while the rearwardly curved portion 53 is adapted to form the reflective surface for the sealed beam lamp. The flange 52 provides a support medium for the lamp 51.

In accordance with the principles of the present invention and as is clearly shown in connection with Figures 1, 7 and 9, an improved retaining structure is provided for the sealed beam lamp 51.

First of all, it will be noted that the lamp support plate 21 provides an annular abutment surface 56 which surrounds the opening 22 and against which one face of the flange 52 on the sealed beam lamp 51 may engage as in the alternative arrangement of Figure 9a. At diametrically opposed portions of the opening 22 are provided post members 57 which project generally axially of the opening 22 and in the orientation of the present disclosure to the rear of the support plate 21. Each of the posts 57 is generally of uniform cross-section along the length thereof, however, a portion near one end as indicated at 58 is slightly tapered in converging direction and terminates in an enlarged head portion indicated at 59.

An annular flange retainer ring 60 is provided in accordance with the principles of the present invention and includes a first leg 61 concentric with the flange 52 of the lamp 51 and second leg 62 axially thereof.

In Figure 9a the leg 61 overlies the flange 52 of the sealed beam lamp 51 and a second leg 62 abuttingly engages the opposite face of the flange 52 in opposed relation to the abutment surface 56 on the lamp support plate 21.

Projecting radially outwardly of the flange retainer ring 60 in arrangements of Figures 9 and 9a are a pair of circumferentially spaced spring clip members indicated at 63. The spring clip members 63 preferably take the form of a strip form member bent to provide a first leg 63a firmly assembled by spot welding or some other fastening means to the retainer ring 60 and a second leg 63b bent at right angles to the leg 63a and a third leg 63c bent to form together with the leg 63b a pair of angularly intersecting legs providing an acute included angle therebetween. The end of the leg 63c terminates in a flat portion 63d which is generally parallel to the leg 63b and which constitutes a finger manipulable section to flex the leg 63c against the inherent resilience thereof toward the leg 63b.

As is clearly shown in Figure 7, the strip form spring clip member 63 is provided with an elongated slot 64 which extends through substantial portions of both legs 63b and 63c and which is of sufficient width to receive the reduced neck portions 58 of corresponding post member 57. By virtue of such provision, there is an open recess at the apex portion between the legs 63b and 63c which receives the post 57 whereupon the leg 63c can be resiliently displaced and snapped in behind the enlarged head portion 59, to place the ring 60 in firm assembly with the support plate 21.

In Figure 9a the spring clip member 63 clamps the flange 52 between the engagement surface 56 and the leg 62 of the retainer 60.

To fasten the lamp 51 to the ring 60, circumferentially spaced clips 65 are provided each comprising a strip form member having spaced legs 65a and 65b clamping its leg 61 and having a spring finger 65c for clamping the flange 52 of the lamp 51.

An annular rim portion 66 is provided on the support plate 21 opposite the abutment surface 60 and provides a recess for seating the flange of a dish-shaped color screen 67. Suitable retainer means such as is indicated at 68 are provided to retain the color screen 67 in firm assembly with the support plate 21, thereby to intercept the beam of light projected by the sealed beam lamp 51. In adapting the unit 10 for use as a warning light on vehicles, it is desirable that the color screen 67 take the form of a red translucent article made of glass or plastic so that the beam of projected light may be colored for warning purposes.

In Figure 8, an alternative form of sealed beam lamp retaining means is provided. In this form of the invention, the lamp support plate 21' is provided with an opening 22' and the flange retainer ring 60' carries in firm assembly therewith a plurality of circumferentially spaced spring clip members 63'. Each spring clip member comprises a strip form member having a leg 63a' underlying the annular retainer member 60, a spaced parallel leg 63b' overlying the same leg portion of the retainer member 60, a third leg portion 63c' at right angles thereto and a radially inwardly offset lug 63d'. With the arrangement thus provided, the sealed beam lamp is merely pushed into the retainer ring 60 and the flange 52 snaps in behind the retainer lug 63d so as to be clamped in firm assembly with the retainer ring 60.

A plurality of circumferentially spaced lugs 69 can be provided on the back side of the retainer ring 60 and are assembled to the support plate 21 by suitable fasteners indicated at 70.

In the event it is desired to utilize the lamp construction thus far described with sealed beam lamps only instead of with a separate reflector 44 and incandescent bulb 51, the arrangement of Figures 10 and 11 may be effectively utilized. In this embodiment of the invention, a support plate 21a is provided having a plurality of openings 22a, each adapted to receive a sealed beam lamp. As will be noted upon referring particularly to Figure 11, there are three openings 22a, the two bottom openings being aligned on a common center line axis and the third opening being located superjacent the two bottom openings so as to form essentially a triangular disposition. The support plate 21a is provided with a boss portion 24a apertured as at 25a to receive the tiltable post of a universal bearing as described above. The plate 21a is further provided with boss portions 26a suitably apertured to receive the studs 27 so that all of the sealed beam lamps mounted in the respective openings 22a may be simultaneously oscillated.

In Figures 4 and 5, the pedestal mount 16 is shown in greater detail and includes a bracket member 71 which provides a pivot connection as at 72 with a support bracket 73. The support bracket 73 has a rectangular recess 74 receiving a conformably shaped end 76 of a threaded stud member 77. The threaded stud member threadedly engages an adjustment cap 78 having a boss 79 on the end thereof received in a recess provided on the underside of the frame bracket 12 as at 80.

When the support bracket 73 is mounted on a supporting structure such as a locomotive, threaded adjustment of the cap 78 with respect to the stud 77 will pivotally hinge the frame bracket 12 around the pivot axis as at 72 until the stop member 14 engages a cooperating portion of the support structure such as the locomotive, thereby wedging the frame bracket 12 in firm adjusted position.

With the provisions of the present invention, either the incandescent bulb 55, or the sealed beam lamp 51 may be separately or concurrently energized together with the motor 38, whereupon a beam of light will be projected outwardly of the casing 11 selectively characterized as to color.

In Figure 3 a control circuit is shown for controlling the energization of the bulb 55, sealed beam lamp 51 and the motor 38. The control circuit includes a pressure-responsive switch 76 and also a selector switch 77.

Assuming that the control circuit and the warning light 10 are to be employed on a vehicle such as a railroad locomotive, the pressure-responsive switch 76 will be connected to the air brake system so that application of the brakes will result in a change of air pressure in the brake line whereupon the pressure-responsive switch 76 will be actuated to close the contacts thereof. A relay 78 will be energized and will close switches 79 and 80. When the switch 79 closes, a holding circuit to the relay 78 will be completed so that the relay 78 will remain energized.

When the switch 80 closes, the relay 81 will be energized completing the circuits to the motor 38 and the sealed beam lamp 51 so that a moving beam of colored light will be produced. A pilot light 82 is also provided which will be energized to indicate energization of the motor 38 and the seal beam lamp 51.

A dimming control resistance 83 is also provided in circuit with the bulb 55 so that the intensity of the light may be selectively dimmed. A control switch 84 is also provided to momentarily energize the motor 38 at the "inch" position or to energize the motor 38 for steady operation at "run."

If manual control is desired, the selector switch 77 may be moved between positions "R" and "W" corresponding to the "Red" position and the "White" position wherein either the sealed beam lamp 51 or the bulb 55 are energized, respectively.

Although minor modifications might be suggested by those versed in the art, it should be understood that we wish to embody within the scope of the patent warranted hereon, all such modifications as might be reasonably and properly come within the scope of our contribution to the art.

We claim as our invention:

1. A warning light, comprising, a reflector member having a curved reflective surface to collect and focus rays of light into a beam of light and having a centrally disposed aperture formed therein, a first selectively energizable electric light source at the focal point of said reflective surface, and a second selectively energizable light source consisting of a sealed beam lamp comprising a glass envelope having its own filament, reflective surface and lens, in said opening to project a second beam of light in a common direction with said reflector.

2. A warning light as defined in claim 1 and movable support means carrying said sealed beam lamp and said reflector member for selective adjustment of the direction of beam projection.

3. A warning light as defined in claim 2, and an electric motor having a driving connection with said support means to continuously oscillate said support means, whereby the beams of light will be projected in a moving pattern.

4. A warning light as defined in claim 1, wherein said sealed beam lamp and said electric light source comprise two separate light sources and a color screen intercepting the light emanating from one of said light sources whereby one of the beams of light will be projected as a colored beam of light whenever said one light source is energized.

5. A warning light as defined in claim 1, and a color screen over said sealed beam lamp to project a colored beam of light whenever said sealed beam lamp is energized.

6. A warning light, comprising, a reflector member having a curved reflective surface to collect and focus rays of light into a beam of light and having a centrally disposed aperture formed therein, an electric light source at the focal point of said reflective surface, a sealed beam lamp comprising a glass envelope having its own filament, reflective surface and lens, mounting means positioning said sealed beam lamp in said opening to project a second beam of light in a common direction with the first mentioned beam of light, circuit means to selectively energize said sealed beam lamp and said light source including an electric motor having a drive connection with said support means to continuously oscillate said support means, thereby to project the beams of light in a moving pattern, and a color screen over said sealed beam lamp whereby a colored beam of light will be projected whenever said sealed beam lamp is energized.

7. A retaining mechanism for a sealed beam lamp, comprising, a support means providing an opening, an abutment shoulder outwardly adjacent said opening and a post adjacent said shoulder projecting in longitudinal direction relative to said opening, said post provided with an enlarged head portion spaced longitudinally of said shoulder, a sealed beam lamp in said opening comprising a flanged glass envelope having its own filament, reflective surface and lens abutting said shoulder at one side of the flange on said glass envelope, an annular ring engaging the opposite side of the flange on said glass envelope and having a spring clip projecting radially outwardly thereof aligned in register with said post, said clip comprising a strip-form member bent to provide angularly intersecting legs prescribing an acute included angle therebetween and arranged so that the legs are longitudinally spaced apart at the free ends thereof, both of said legs being slotted to provide an open recess at the apex of the legs of sufficient width to receive said post, one of said legs resiliently displaceable in longitudinal direction to snap in behind said enlarged head portion, thereby to resiliently clamp the flange on said glass envelope between said shoulder and said ring.

8. A warning light comprising an annular dish-shaped support member having a pair of diametrically opposed posts projecting generally axially thereof and providing an annular abutment surface between said posts, a sealed beam lamp comprising a glass envelope having an annular flange and providing its own filament, reflective surface and lens, one side of said annular flange engaging said annular abutment surface, an annular ring engaging the opposite side of said flange and having a spring clip projecting radially outwardly thereof to engage each respective one of said posts, said clip comprising a strip form member bent to provide angularly intersecting legs prescribing an acute included angle therebetween, both of said legs being slotted to provide an open recess at the apex of the legs of sufficient width to receive said posts, one of said legs being resiliently displaceable axially to snap in behind an enlarged head portion, a curved reflector in said support member having a centrally disposed aperture in register with said sealed beam lamp, and a light bulb carried by said support member at the focal point of the reflector whereby the sealed beam lamp and the reflector project substantially co-directional beams of light on a substantially common axis of projection.

9. A warning light comprising a support frame bracket, an electric motor having a power take off carried on said support frame bracket, a rotatable eccentric crank arm on said power take-off, pivot means on said support frame bracket, a plate supported on said pivot means for universal oscillatory movement, a link arm pivotally connected to said plate and to said crank arm to oscillate said plate, and a plurality of electric light source means aligned on and carried by said plate to project separate beams of light on a common beam axis in a motion pattern.

10. A warning light as defined in claim 9, wherein said plate is provided with a centrally disposed opening therein, a sealed beam lamp in said opening, an annular reflector on said plate around said opening and extending forwardly thereof, and an electric light bulb carried by said plate at the focal point of said annular reflector and spaced forwardly of said sealed beam lamp, whereby said sealed beam lamp and said electric light bulb and its associated annular reflector will project co-directional beams of light in a motion pattern.

11. A warning light, comprising, a frame bracket carrying an electric motor having a power take-off providing a rotatable eccentric crank arm, pivot means on said support bracket, a plate supported on said pivot means for universal oscillatory movement, a link arm pivotally connected to said plate and to said crank arm to oscillate said plate, and a plurality of sealed beam lamps carried by said plate, said plate having an opening for each lamp and including a pair of diametrically opposed posts projecting axially of each respective opening, the edges of said opening providing an annular support surface, each of said sealed beam lamps comprising a glass envelope having an annular flange and providing its own filament, reflective surface and lens, one side of said flange engaging said annular support surface, an annular ring engaging the opposite side of said flange and having a spring clip projecting radially outwardly to engage each respective post, said clip comprising a strip form member bent to provide angularly intersecting legs prescribing an acute included angle therebetween and spaced apart axially of said ring at the free ends of said legs, both of said legs being slotted to provide an open recess at the apex of the legs of sufficient width to receive said post, one of said legs being resiliently displaceable to snap in behind said enlarged head portion formed on each respective post, thereby to clamp said flange on said glass envelope between said annular support surface and said ring.

12. A retaining mechanism for a sealed beam lamp, comprising, a support means providing an opening, a post extending axially of said opening, a sealed beam lamp for said opening having a flanged glass envelope providing its own filament, reflective surface and lens, an annular ring concentric of said lamp at the flanged portion thereof, a plurality of clip members carried by and extending radially inwardly of said ring and engaging the flanged portion of said lamp in snap-on assembly, and a spring clip on said ring projecting radially outwardly thereof to engage said post, said clip comprising a strip-form member bent to provide angularly intersecting legs prescribing an acute included angle therebetween and spaced apart axially of said ring at the free ends of the legs, both of said legs being slotted to provide an open recess at the apex of the legs of sufficient width to receive said post, one of said legs being resiliently displaceable in axial direction to snap in behind an enlarged head portion provided on said post, thereby to clamp the ring and lamp in firm assembly with said support means.

13. A warning light comprising an annular dish-shaped support member having a pair of diametrically opposed posts projecting generally axially thereof and providing a support means, a sealed beam lamp comprising a glass envelope having an annular flange and providing its own filament, reflective surface and lens, an annular ring surrounding said lamp and having a plurality of circumferentially spaced spring clips snapped on the flanged portion of said lamp to assemble said lamp with said ring, and a spring clip projecting radially outwardly of said ring to engage each respective one of said posts, said clip comprising a strip form member bent to provide angularly intersecting legs prescribing an acute included angle therebetween, both of said legs being slotted to provide a recess of sufficient width to receive said posts, one of said legs being resiliently displaceable axially to snap in behind an enlarged head portion provided on said posts, a curved reflector in said support member having a centrally disposed aperture in register with said sealed beam lamp, and a light bulb carried by said support member at the focal point of the reflector whereby the sealed beam lamp and the reflector project substantially co-directional beams of light on a substantially common axis of projection.

References Cited in the file of this patent

UNITED STATES PATENTS

| | | | |
|---|---|---|---|
| 1,582,138 | Heines | Apr. 27, | 1926 |
| 1,836,845 | Halvorson | Dec. 15, | 1931 |
| 2,138,079 | Taylor | Nov. 29, | 1938 |
| 2,273,747 | Adler | Feb. 17, | 1942 |
| 2,285,591 | Larsen | June 9, | 1942 |
| 2,464,318 | Kennelly | Mar. 15, | 1949 |
| 2,530,360 | Price | Nov. 14, | 1950 |
| 2,571,375 | Morgenstern | Oct. 16, | 1951 |
| 2,654,875 | Heehler | Oct. 6, | 1953 |

FOREIGN PATENTS

| | | | |
|---|---|---|---|
| 593,522 | France | May 29, | 1925 |
| 736,214 | France | Sept. 12, | 1932 |
| 747,832 | France | Apr. 4, | 1933 |